United States Patent [19]

Klickstein

[11] Patent Number: 4,765,279
[45] Date of Patent: Aug. 23, 1988

[54] CHILD TO ADULT TETHER

[76] Inventor: Reuben B. Klickstein, 51 Indian Hill, Carlisle, Mass. 01741

[21] Appl. No.: 825,878

[22] Filed: Feb. 4, 1986

[51] Int. Cl.$^4$ .............................................. A01K 1/00
[52] U.S. Cl. ..................... 119/109; 119/96; 128/133
[58] Field of Search ............... 119/96, 109; 128/133, 128/134

[56] References Cited

U.S. PATENT DOCUMENTS

| | | | |
|---|---|---|---|
| 2,289,802 | 7/1942 | Norton | 119/109 |
| 2,333,488 | 11/1943 | Parth | 119/109 |
| 2,994,300 | 8/1961 | Grahling | 119/96 |
| 3,104,650 | 9/1963 | Grahling | 119/96 |
| 3,295,501 | 1/1967 | Riley | 119/96 |
| 4,273,215 | 6/1981 | Leggett | 119/96 X |
| 4,422,455 | 12/1983 | Olsen | 128/134 |
| 4,638,764 | 1/1987 | Anderson | 119/96 |

Primary Examiner—Gene Mancene
Assistant Examiner—Adriene J. Lepiane

[57] ABSTRACT

Adult to child tethers consist of lengths of narrow flexible material. Each end of the material is closed to form loops, one to hold the child and adjustable and the other to be held by the adult and also preferably adjustable. The intermediate portion of each tether of material is of sufficient length to enable the tethered child to walk freely but close to the adult. In one embodiment of the invention, the adjustable loop for the adult may be formed by passing the end of that closed loop through an adjusting slide providing a relatively short intermediate portion and when pulled free of the slide enabling the closed loop to be adjusted for use by the adult with a substantial increase in the length of the intermediate portion resulting.

2 Claims, 1 Drawing Sheet

U.S. Patent  Aug. 23, 1988  4,765,279
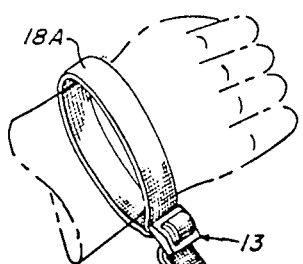
Fig. 1
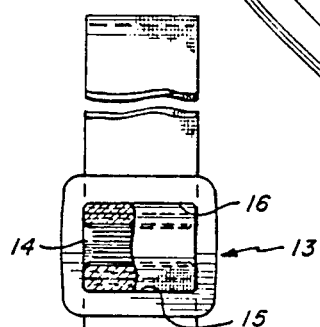
Fig. 2
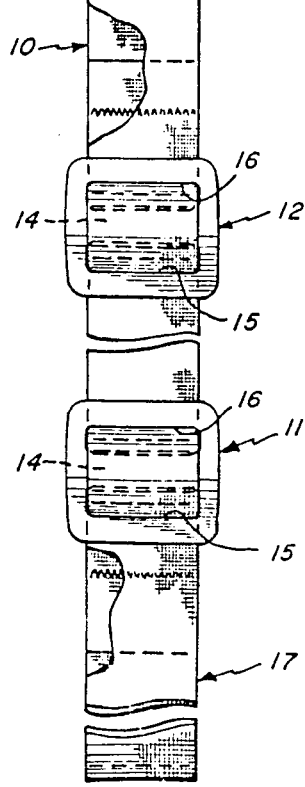
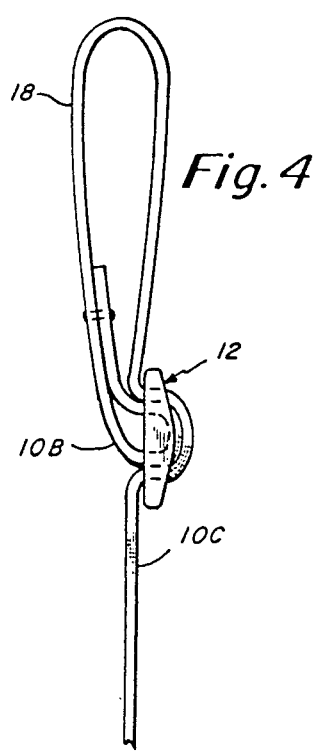
Fig. 4
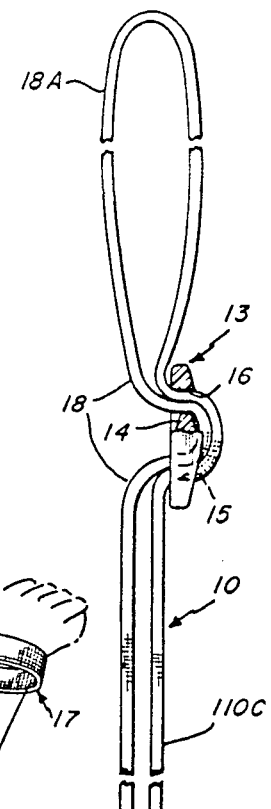
Fig. 3
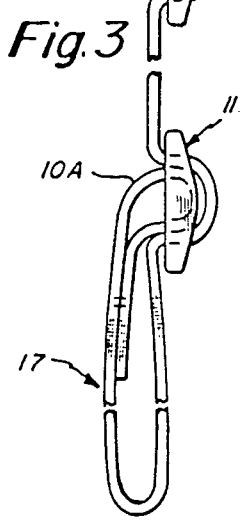

CHILD TO ADULT TETHER

BACKGROUND OF THE INVENTION

It has long been recognized that in public places, stores one example, a small child will often wander away from its mother while she is otherwise busily engaged. Usually, of course, the child is soon found but the potential for serious consequences is such that tethering a child to its mother when in places where it is unsafe for a small child to be unattended has been proposed. While the person so attending the child is usually its mother, such a person may be, of course, another responsible adult (a term which is used throughout the specification and claims to also include any person old enough to have the care of a child entrusted thereto).

Proposals to eliminate the possibility of a child becoming lost in a crowd or straying into a dangerous place have been directed to harnesses or tethers for connecting a child to an adult in a manner permitting the child to walk freely but close to the adult.

The tethers of which I am aware have included an adjustable belt-like unit to encircle the wrist or arm of a child and detachably attached to a member of wanted length which, in one instance, see U.S. Pat. No. 3,104,650, terminated in a loop to be held by a hand of the adult accompanying the child but in other cases was detachably attached to a belt-like adjustable unit to encircle the wrist or arm of that person.

THE PRESENT INVENTION

None of the child to adult tethers of which I am aware combines security and ease of use with a construction capable of economical production and the principal objective of the present invention is to provide tethers particularly for use in tethering a child to an adult which combine these features which are essential to market acceptance.

In accordance with the present invention, this objective is attained by utilizing lengths of narrow flexible material which is preferably thin, flat and slightly resilient. Each length has a closed, integral loop at each end, one for the wrist or arm of a child and is adjustable to be a holding fit thereon and the other to be held by the attending adult and preferably is also adjustable to be a holding fit on the wrist or arm thereof and the portion of its length between the loops is the intermediate portion of the tether which in use must be of sufficient length to enable the child to walk freely beside the adult. When a loop is adjustable, the smaller the loop the longer the intermediate portion.

In making such a tether, two slides are employed to form the end loops when both loops are to be adjustable. Each slide is of the type having first and second slideways separated by a transverse bar. Each end of the length of material is closed about the bar of the appropriate one of the slides and each loop is completed with the length of material passing upwardly through the first slideway, over the bar and downwardly through the second slideway of the slide to which the proximate end of the length of material is secured thus enabling the size of each loop to be adjusted by pulling the length in one direction or the other through the slide forming that loop.

With the slides so spaced apart that the end loops are appropriate to be fitted, one to the arm of a child and the other to the arm of the adult, an intermediate portion of maximum length is established when the slide forming the loop to be held by the adult is in close to the other slide. A long loop is provided which may be held by a hand of the adult and which also serves to provide a much shortened intermediate portion.

In another embodiment of the invention, a third slide of the same type as the other slides, is employed and an end portion of the long loop is passed upwardly through the first slideway, over the bar and downwardly through the second slideway of the third slide to form a loop that may be fitted to the arm of the adult with the intermediate portion of a wanted minimum length. The third slide is easily removed when lengthening of the intermediate portion is wanted and as easily replaced when both a shorter intermediate portion and a loop to be fitted to the arm of the adult is wanted.

From the foregoing, it will be apparent that tethers in accordance with the invention are essentially integral and avoid the disadvantages inherrent in tethers which consist of plural, interconnected components.

BRIEF DESCRIPTION OF THE DRAWINGS

The accompanying drawings illustrate preferred embodiments of the invention of which FIG. 1 is a view of a tether connecting an arm of a child to an arm of an adult;

FIG. 2 is a plan view of the tether on an increase in scale and broken away to foreshorten the drawing;

FIG. 3 is a side view of the tether on the scale of FIG. 2; and

FIG. 4 is a view similar to FIG. 3, illustrating another emobidment of the invention.

THE PREFERRED EMBODIMENT OF THE INVENTION

The child to adult tether illustrated by the drawings consists of a length of narrow fabric of a type having lengthwise elasticity. The fabric length is generally indicated at 10 and is formed into a tether by means of a plurality of slides generally indicated at 11, 12, and 13, respectively and with each slide of a type having a central transverse bar 14 establishing first and second slideways 15 and 16, respectively.

One end 10A of the fabric length 10 is caught about the transverse bar 14 of the slide 11 and the length 10 is then formed into an end loop 17 and passed upwardly through the slideway 15 of the slide 11 and then downwardly through the slideway 16 there of thus enabling the loop 17 to be adjusted to receive the arm of a child and then adjusted to securely hold that arm.

The length 10 is then passed upwardly through the slideway 15 of the slide 12, and then downwardly through the slideway 16 thereof and the end 1OB of the length 10 is then caught about the transverse bar 14 of that slide thus to form a second end loop 18 which may be held by one hand of the adult or adJusted to receive and fit the arm, typically the unit, of that person.

The portion 10C of the fabric length establishes the length of the tether between the adult and the child and may be shortened by positioning the slide 12 close to the slide 11 and passing the other end of the loop 18 upwardly through the slideway 15 of the slide 13 over the transverse bar and downwardly through the slideway 16 thereof to establish an end loop 18A for use by the adult and a shortened intermediate portion 110C wherein there are two layers of the fabric. It will be appreciated that the slide 13 is easily removed and easily replaced to enable the tether to be used in its shortest or longest state.

I claim:

1. An adult to child tether of the type having a first loop to be held by the adult, a second loop to hold the child and an intermediate portion of sufficient length to enable the child to walk freely but close to the adult, said tether comprising a length of narrow, flexible material having first and second ends, an adjustable connection between the first end and said intermediate portion establishing the first loop, an adjustable connection between the second end and said intermediate portion establishing the second loop, and a removable slide having a central transverse bar separating first and second material receiving slideways, an end portion of the first loop disposed upwardly through the first slideway, over the bar and downwardly through the second slideway thereby to so divide the first loop as to provide an end portion to be held by the adult and an intermediate portion the length of which depends on the space between the adjustable connections and whereby when the slide is detached, the adjustable connection establishing the first loop can then be adusted to decrease the size of the first loop and increase the length of the intermediate portion.

2. The adult to child tether of claim 1 in which both adjustable connections are slides having a central transverse bar separating first and second slideways, each end of the length of material closed about the bar of the appropriate one of the slides, doubled to provide a loop and extending upwardly through the first slideway, over the bar and downwardly through the second slideway.

* * * * *